US012056276B1

(12) United States Patent
Chapiro et al.

(10) Patent No.: US 12,056,276 B1
(45) Date of Patent: Aug. 6, 2024

(54) EYE TRACKING BASED ON VERGENCE

(71) Applicant: Meta Platforms Technologies, LLC, Menlo Park, CA (US)

(72) Inventors: Alexandre Chapiro, Sunnyvale, CA (US); Ajit Ninan, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/140,563

(22) Filed: Apr. 27, 2023

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 2027/0178* (2013.01); *G02B 2027/0187* (2013.01)

(58) Field of Classification Search
CPC ................ G06F 3/013; G02B 27/0172; G02B 2027/0178; G02B 2027/0187; G06K 9/00845; G06T 7/40; G06T 3/0093; H04N 13/296; H04L 67/75
See application file for complete search history.

(56) References Cited

U.S. PATENT DOCUMENTS

| 9,984,507 B2 | 5/2018 | Aksoy et al. |
| 10,890,968 B2 | 1/2021 | Kurlethimar et al. |
| 11,308,698 B2 | 4/2022 | Emery et al. |
| 2017/0169602 A1* | 6/2017 | Blackmon .............. G06T 3/0093 |
| 2020/0081524 A1* | 3/2020 | Schmidt ................... G06F 3/013 |
| 2020/0184653 A1* | 6/2020 | Faulkner .................... G06T 7/40 |
| 2020/0334858 A1 | 10/2020 | Hoffmann et al. |
| 2021/0312713 A1* | 10/2021 | Peri ......................... H04L 67/75 |
| 2022/0351345 A1* | 11/2022 | Price ......................... G06T 7/40 |
| 2023/0213755 A1* | 7/2023 | Ollila ................... H04N 13/296 348/340 |

FOREIGN PATENT DOCUMENTS

| EP | 3074844 B1 | 3/2018 |
| EP | 3819813 A1 * | 5/2021 ......... G06K 9/00845 |
| WO | 2020147948 A1 | 7/2020 |

OTHER PUBLICATIONS

Sugano Y., et al., "Calibration-Free Gaze Sensing Using Saliency Maps," 2010 IEEE Computer Society Conference on Computer Vision and Pattern Recognition, Jun. 13, 2010, 8 pages.

* cited by examiner

*Primary Examiner* — Richard J Hong
(74) *Attorney, Agent, or Firm* — Freestone Intellectual Property Law PLLC; Aaron J. Visbeek

(57) ABSTRACT

An eye tracking technique obtains a more precise estimate of a gaze location on an image by determining the vergence location of a user's eyes. The more precise estimate of the gaze location may be obtained by using multiple inputs, including a coarse estimate of the gaze location using a camera that receives non-visible light reflected from the eyes, discrete probabilities of gaze locations for each eye, depth information for objects contained in the image, and saliency information for objects contained in the image.

20 Claims, 7 Drawing Sheets

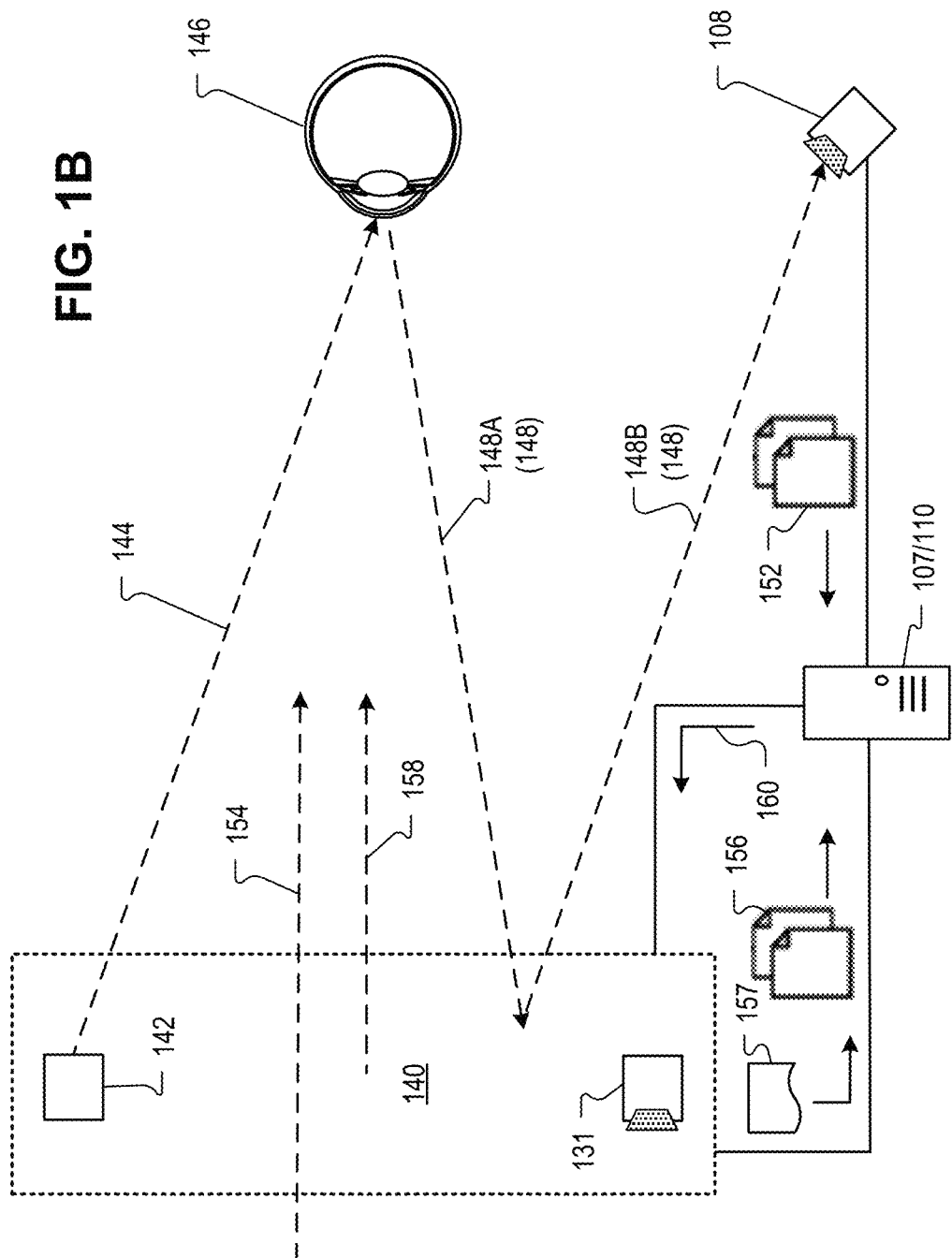

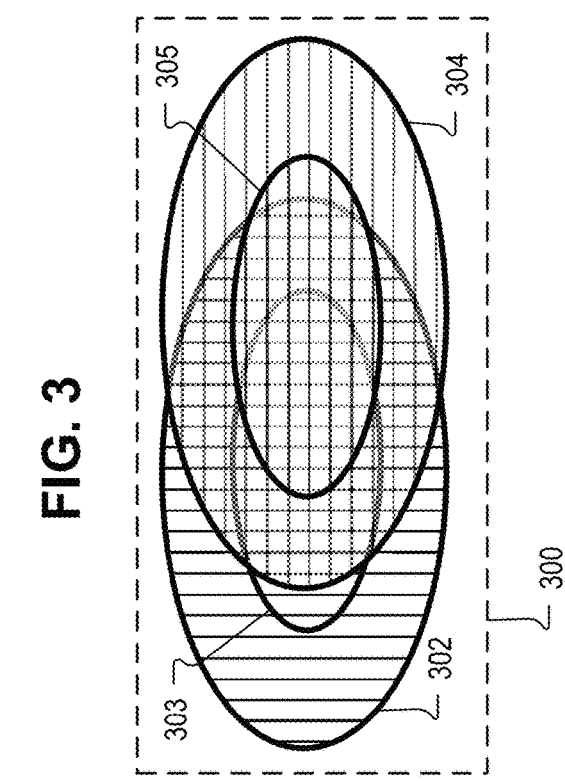

EYE TRACKING BASED ON VERGENCE

TECHNICAL FIELD

This disclosure relates generally to eye tracking, and in particular but not exclusively relates to eye tracking based on vergence of eyes.

BACKGROUND INFORMATION

Smart devices may include one or more electronic components for use in a variety of applications, such as gaming, aviation, engineering, medicine, entertainment, video/audio chat, activity tracking, and so on. Some smart devices, such as head mounted displays (HMDs), may perform eye-tracking which may enhance the user's viewing experience. For example, it may be advantageous for an HMD to determine the location of the eyes of the user and/or to determine where the eyes of the user are focusing, so as to alter the content being presented to the user by the HMD. However, conventional eye-tracking techniques may be error prone.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 1B illustrates additional details pertaining to the operation of the HMD of FIG. 1A, in accordance with aspects of the disclosure.

FIG. 3 illustrates eye tracking based on vergence, in accordance with aspects of the disclosure.

DETAILED DESCRIPTION

Figure 1A:
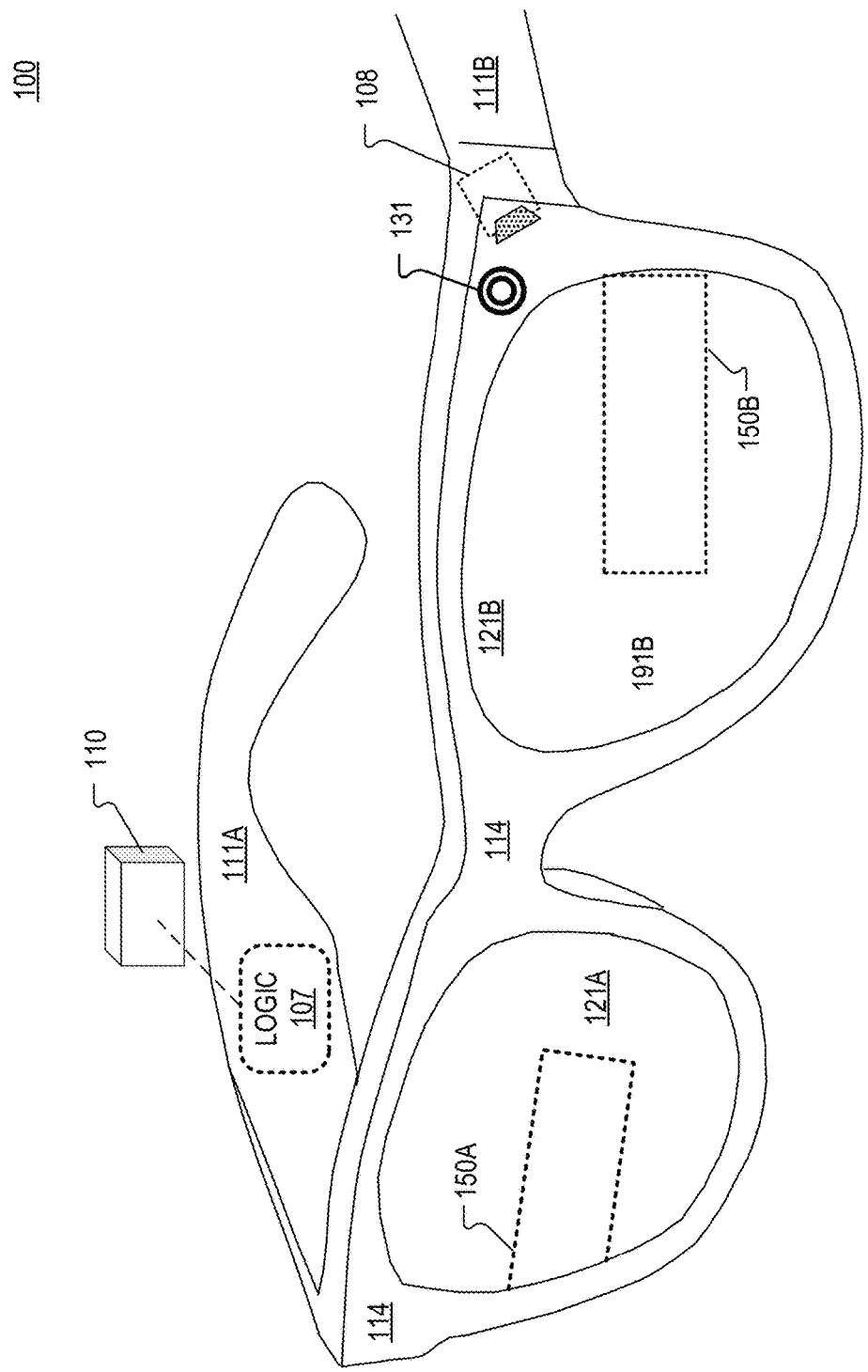
FIG. 1A illustrates a head mounted display (HMD) that may include eye tracking capability based on vergence, in accordance with aspects of the disclosure.

Embodiments of eye tracking based on vergence are described herein. In the following description, numerous specific details are set forth to provide a thorough understanding of the embodiments. One skilled in the relevant art having the benefit of this disclosure will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye optical system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 μm.

An apparatus, system, and method for eye tracking based on vergence are described in this disclosure. Performing eye tracking using vergence as described in this disclosure provides benefits over other types of eye tracking techniques that typically rely solely on light reflections to determine eye position.

Eye tracking is a useful tool for head mounted devices, such as head mounted displays (HMDs) for augmented reality (AR), virtual reality (VR), smartglasses, and other types of applications. The position/location of the user's gaze can be leveraged in these applications, for instance, to provide/operate gaze-contingent interfaces (e.g., using gaze location as an input to a user interface (UI), or rendering UI elements that follow the user's gaze), to perform display adaptation (e.g., foveated rendering or gaze-contingent tone mapping), to perform gaze-contingent image quality corrections (e.g., dynamic uniformity corrections for waveguides), and other actions related to the operation of the HMD.

A typical eye tracking technique involves illuminating an eye with non-visible light, and then tracking the non-visible light that is reflected from the eye in order to determine the position of the eye. Unfortunately, such eye tracking techniques may be error prone and provide only an approximate/coarse estimate of the gaze location. With applications that are dependent upon a determination of gaze location, such as those identified above, a more precise determination of gaze location would be beneficial to reduce UI error, to improve image quality, and to more accurately/efficiently perform display and image adaptation, etc.

To address the above and other drawbacks, the embodiments disclosed herein provide improved eye tracking by augmenting the information obtained by typical eye tracking techniques that use reflected non-visible light. The embodiments of eye tracking disclosed herein use binocular data, such as vergence of the eyes, to provide a more precise determination of the gaze location of the eyes. Depth, edges, saliency, and other characteristics of objects in an image can also be additionally used, along with vergence, to provide the more precise determination of the gaze location. These and other embodiments are described in more detail in connection with FIGS. 1A-6.

FIG. 1A illustrates a head mounted display (HMD) 100 that may include eye tracking capability based on vergence, in accordance with an embodiment of the disclosure. The HMD 100 includes a frame 114 coupled to arms 111A and 111B. Lens assemblies 121A and 121B are mounted to the frame 114. The lens assemblies 121A and 121B may include a prescription lens matched to a particular user of the HMD 100. The illustrated HMD 100 is configured to be worn on or about a head of a wearer of the HMD 100, and is one example of a head mounted device.

In the HMD 100 illustrated in FIG. 1A, each lens assembly 121A/121B includes a display waveguide 150A/150B to an eyebox region for viewing by the user of the HMD 100. While the HMD 100 is illustrated as a head mounted display, implementations of the disclosure may also be utilized on head mounted devices (e.g. smartglasses) that do not necessarily include a display.

The lens assemblies 121A and 121B may appear transparent to the user to facilitate augmented reality (AR) or mixed reality (MR) to enable the user to view scene light from the environment outside of the HMD 100 around the user, while also receiving image light directed to their eye(s) by, for example, the waveguides 150. The lens assemblies 121A and 121B may include two or more optical layers for different functionalities such as display, eye-tracking, and optical power.

The frame 114 and arms 111A and 111B may include supporting hardware of the HMD 100 such as processing logic, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. At least some of components of the processing logic may comprise part of a processing system 110. In one embodiment, the HMD 100 may be configured to receive wired power. In one embodiment, the HMD 100 is configured to be powered by one or more batteries. In one embodiment, the HMD 100 may be configured to receive wired data including video data via a wired communication channel. In one embodiment, the HMD 100 is configured to receive wireless data including video data via a wireless communication channel.

FIG. 1A illustrates one or more example eye tracking cameras 108 (collectively referred to as the camera(s) 108) that may be disposed at different positions on the HMD 100, such as at various positions on the frame 114. The camera 108 may be configured for eye-tracking, for example by being inwardly facing towards the user so as to capture images of the eye of the user. With eye-tracking, non-visible light sources (not shown in FIG. 1A) may direct non-visible light towards the eye of the user, and the camera 108 may be configured to receive the reflected non-visible light so as to generate an image of the eye. The non-visible light may include near-infrared (near-IR) or infrared light (e.g., the camera 108 is an IR camera). The processing logic of the HMD 100 may then process the generated image to determine a gaze direction, etc. of the user for eye-tracking purposes.

Control logic 107 may be communicatively coupled to the camera 108 and also to any other component(s) of the HMD 100 that provides information as to content that the user may be viewing. For example, the user may be viewing display content that is provided via image light from the display waveguide 150A/150B, or may be viewing scene content (e.g., a scene outside of the HMD 100 as provided via scene light) through the lens assemblies 121A and 121B, etc. The HMD 100 of some embodiments may include one or more additional cameras 131 (collectively referred to as the camera(s) 131) that face outwardly from the HMD 100 away from the user, so as to capture images of the scene outside of the HMD 100 that is being viewed by the user, and such scene images may also be provided to the control logic 107.

Based at least in part on the information provided to the control logic 107, such as information pertaining to the content being viewed by the user (and also eye tracking information indicative of a gaze direction of the user's eyes), the control logic 107 may generate instructions or data to control various operational aspects of the HMD 100, such as changing a characteristic (e.g., brightness, focus, content, etc.) of a displayed image, adjustment of intensity and/or direction of light that is outputted by light sources, adjustment of mirrors of the HMD 100, power adjustments, error correction, rendering and operating UIs, and so forth.

The control logic 107 may be disposed on the frame 114 of the HMD 100, or elsewhere on or off the HMD 100. The control logic 107 and other components of the HMD 100 of various embodiments may form part of the processing system 110 that performs operations related to processing images, and processing/generating related signals, data, instructions, or other content pertaining to the operation of the HMD 100. As will be described in further detail later below, the various images and other information processed by the processing system 110 may be used to more accurately perform eye tracking using vergence associated with the user's eyes, or more specifically, obtaining a more precise estimation of the gaze location of the user's eyes. Components of the processing system 110 may be located on the HMD 100 and/or remotely from the HMD 100

FIG. 1B illustrates additional details pertaining to the operation of the HMD 100 of FIG. 1A, in accordance with aspects of the disclosure. At least some of the components of the HMD 100 depicted in FIG. 1A (such as the lens assemblies 121A/121B, display waveguide 150A/150B, etc. and their related components), and other components of the HMD 100 that support the operation of the HMD 100, are symbolically depicted in FIG. 1B by a dashed rectangular box representing a near-eye optical system 140.

As shown in FIG. 1B, the near-eye optical system 140 may include the camera(s) 131 for capturing images of the scene outside of the HMD 100. For purposes of clarity of illustration and description, the camera(s) 108 for eye tracking and the control logic 107 (and processing system 110) are depicted in FIG. 1B as lying outside of the dashed rectangular box of the near-eye optical system 140. It is understood that at least some of these components may form part of the near-eye optical system 140 within the dashed rectangular box in various embodiments, while at least some of these components may be separate from the near-eye optical system 140 in other embodiments.

For eye tracking operations, the near-eye optical system 140 may include one or more non-visible light sources 142 (collectively referred to as light source(s) 142) configured to generate and direct non-visible light 144 towards the eye(s) 146 of the user. The eye(s) 146 may in turn reflect non-visible light 148. FIG. 1B depicts an embodiment in which the non-visible light 148 is reflected by the eye(s) 146 back to the near-eye optical system 140 (as non-visible light 148A), and the near-eye optical system 140 then redirects (e.g., by using a partial mirror or other optical component such as diffractive optical element) the non-visible light 148 to the camera 108 (as non-visible light 148B). In some embodiments, the eye(s) 146 may reflect the non-visible light 148 directly to the camera 108, without necessarily being redirected by a mirror (or other optical component of the near-eye optical system 140) to the camera 108. Based on the received non-visible light 148, the camera 108 is configured to generate one or more images 152 of the eye(s) 146. The camera 108 sends the images 152 to the control logic 107 for processing (e.g., by the processing system 110). The images 152 of the eye(s) 146 may be processed by the processing system 110, for purposes of eye tracking to determine a gaze location of the eye(s) 146, as will be described further later below. The light source(s) 142, the camera 108, and related components of the processing system 110 may form parts of an overall eye tracking system in various embodiments.

The near-eye optical system 140 is further configured to pass scene light 154 (originating from the environment outside of the HMD 100) to the eye(s) 146 of the user. Thus, the user is able to view the scene/environment outside of the HMD 100. According to some embodiments, the camera 131 is outwardly facing and is configured to generate one or more images 156 that capture/contain the scene being viewed by the user. The camera sends the images 156 to the control logic 107 for processing (e.g., by the processing system 110). In some embodiments, the images 156 of the scene may also be processed by the processing system 110, for purposes of improving the accuracy of eye tracking, as will be described further later below. The images 156 also may be processed/used by the processing system 110 for purposes other than eye tracking.

The near-eye optical system 140 may be further configured to direct image light 158 to the eye(s) 146. Thus, the user is able to view display content (such as AR content, VR content, etc.) via the image light 158, along with scene content provided via the scene light 154. In some embodiments, the near-eye optical system 140 provides information 157 to the processing system 110 that may include at least some of the display content (e.g., a copy of the virtual image displayed by the near-eye optical system 140), so that the processing system 110 is made aware of the display content that is being presented to the user. In other embodiments, the processing system 110 generates and controls the display content that is being presented to the user, and so the processing system 110 already has knowledge about the display content and need not be separately informed (e.g., via the information 157) of the display content that is being presented to the user.

In some embodiments, the information 157 may include a depth map that indicates relative depths of graphical objects in an image, a saliency map that indicates (among other things) saliency locations for high-frequency interest points in an image, edge information that indicates edge locations of graphical objects in an image, machine learning inputs/output data, and/or other information usable by the processing system 110 to make a more precise determination of a gaze location of the eyes 146.

According to various embodiments, the processing system 110 is configured to use multiple inputs (e.g., the images 152 of the eye(s) 146, the images 156 having the scene content, the information 157 pertaining to a displayed image, etc.) to perform eye tracking operations. Such eye tracking operations may include, for example, using the images 152 of the eye(s) 146 to determine a location, gaze direction, pupil size, or other characteristics pertaining to the eye(s) 146, as part of a first (and relatively more general/coarse eye) tracking evaluation for the eye(s) 146. The eye tracking operations performed by the processing system 110 may further include, for example, using the images 152 of the eye(s) 146, the images 156 having the scene content and/or display content, and/or other information to determine vergence of the eye(s) 146, as part of a second (and relatively more precise) eye tracking evaluation for the eye(s) 146 that further refines the first eye tracking evaluation.

Based at least in part on the first and second eye tracking evaluations, the processing system 110 can generate instructions 160 that are sent to the near-eye optical system 140, so as to control various operational features of the near-eye optical system 140. For instance, the instructions 160 may cause the near-eye optical system 140 to alter/change the display content being presented to the user, to change illumination levels (including power levels) of the HMD 100, to change focal lengths or other optical characteristics with respect to the scene light 154 and image light 158, or to manipulate other features of the HMD 100 that are influenced by the gaze location etc. of the user's eyes as determined/evaluated by the first and second eye tracking evaluations.

As one example, the eye tracking evaluation(s) performed by the processing system 110 may determine that the user's eyes 146 are looking at a particular graphical object located at a particular region/location of an image displayed by the near-eye optical system 140. As a result, the processing system 110 may generate the instructions 160 to cause the near-eye optical system 140 to perform foveated rendering, such that the particular graphical object at the particular location has a more focused appearance relative to the other locations within the displayed image. Other types of correction/adaptation/rendering can be performed by the processing system 110 in response to the more precise determination of the gaze location of the user's eyes 146.

As still another example, the eye tracking evaluation(s) performed by the processing system 110 may determine that the user's eyes 146 are looking at a scene outside of the HMD 100, such as the user's eyes 146 being focused on a statue at a tourist attraction. As a result, the processing system 110 may generate the instructions 160 to cause the near-eye optical system 140 to make any image displayed by the near-eye optical system 140 to be less visible (e.g., more transparent), so that the user can see the statue more clearly and with reduced obstruction or distraction. Alternatively, the processing system 110 may generate the instructions 160 to cause the near-eye optical system 140 to display an image of historical information pertaining to the statue, so that the user can view/read the image of the historical information in tandem with viewing the statue through the HMD 100.

Figure 2A:
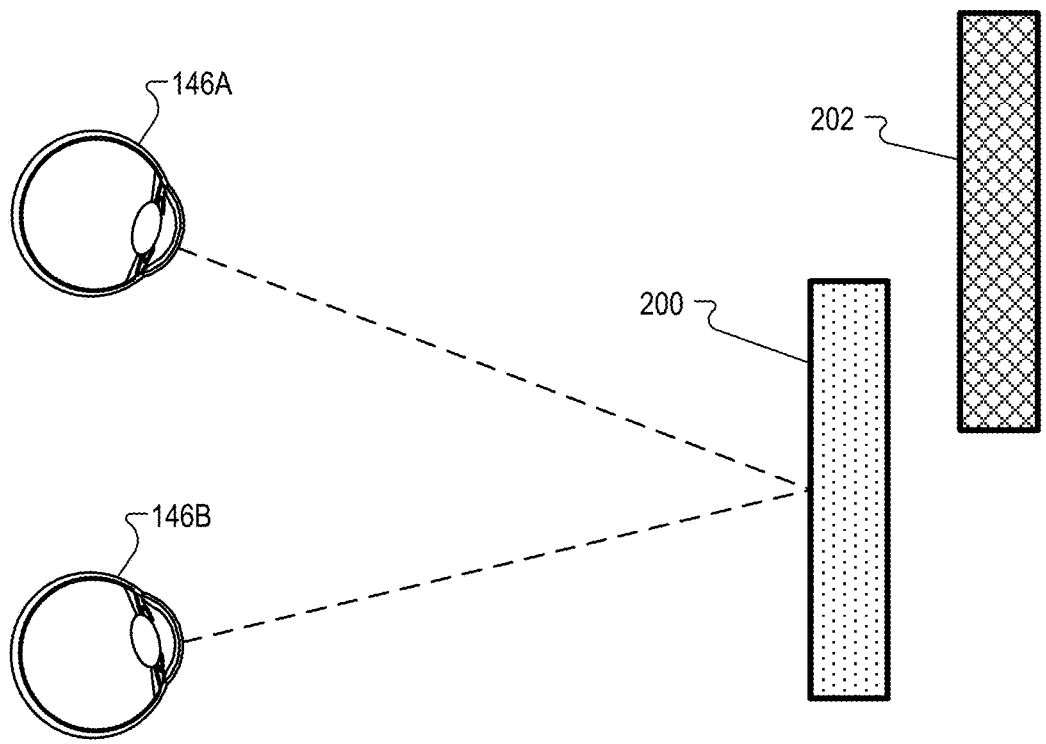
FIGS. 2A and 2B are examples illustrating vergence of eyes, in accordance with aspects of the disclosure.
Figure 2B:
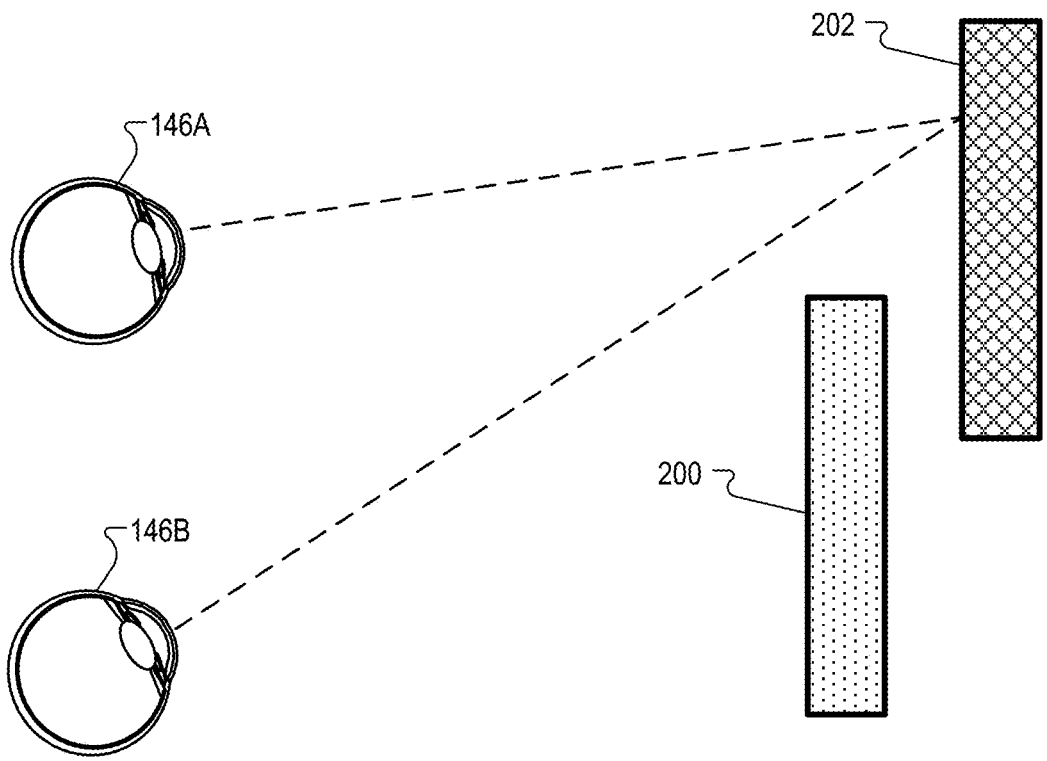

With further detail now with respect to vergence in the context of eye tracking, reference is made next to FIGS. 2A and 2B which illustrate examples of vergence of eyes. Vergence in accordance with some embodiments may generally involve the movement of the user's eyes 146 so that the eyes 146 focus on (or otherwise have gaze directions that intersect at) a certain location at some distance (depth) from the eyes 146. Vergence may generally be based on a principle that both eyes 146 will move such that both eyes 146 will be looking at the same object (e.g., each eye does not independently look at two respective spatially separated objects). Thus, vergence may be considered in some contexts as the intersection of the gaze from each eye.

In the top view of the left eye 146A and the right eye 146B shown in FIG. 2A, both eyes 146A and 146B have moved so that they are both focused on (verging at) at an object 200 that is shallower in depth relative to another object 202. In the top view of the left eye 146A and the right eye 146B shown in FIG. 2B, both eyes 146A and 146B have moved so that they are now both focused on (verging at) the object 202 that is deeper in depth relative to the object 200.

In accordance with various embodiments disclosed herein involving eye tracking based on vergence, a more precise determination of the user's gaze direction (e.g., a narrower zone of a likely location of the user's focus) can be determined by the processing system 110, by taking into account that both eyes 146 are focusing on the same object in terms of depth, such as depicted in the examples of FIGS. 2A and 2B. That is, the eyes 146 verge (intersect) at a point that is dependent on the distance of the object being focused on. Hence, in accordance with some embodiments, the first eye tracking evaluation uses the reflected light 148 and camera 108 (see, e.g., FIG. 1B previously described above) to obtain an initial and coarser estimate of the likely zone of the gaze location of the eyes 146. Then, the second eye tracking evaluation obtains a more precise estimate/determination, by using vergence to narrow down the likely zone of the gaze location of the eyes 146. An example of the first and second eye tracking evaluations is described next with respect to FIG. 3.

FIG. 3 illustrates eye tracking based on vergence, in accordance with aspects of the disclosure. A dashed rectangle symbolically represents the field of view (FOV) 300 of the user's left eye 146A and right eye 146B. The FOV 300 may be a FOV that includes an image being displayed by the HMD 100 to the user, a scene (outside of the HMD 100) being viewed by the user, etc. Within the FOV 300, an initial estimated probability of the gaze location of the left eye 146A is shown at 302, and an initial estimated probability of the gaze location of the right eye 146B is shown at 304, wherein these estimated probabilities are shown as being overlapped. In FIG. 3 and other drawings in this disclosure, features/aspects associated with the left eye 146A are depicted with vertical hatching, features/aspects associated with the right eye 146B are depicted with horizontal hatching, and features/aspects associated with both eyes 146A and 146B combined are shown with cross hatching, for ease of identification when describing and viewing the drawings.

The portions (sub-regions/locations) of the FOV 300 corresponding to the initial probabilities 302 and 304 (e.g., shown as the larger ellipse sizes) of gaze locations of the eyes 146A and 146B may be determined by the processing system 110 using the reflected light 148 and the camera 108 (e.g., based on the images 152 of FIG. 2B), and so represent a coarser estimate of the gaze locations that are obtained via the first eye tracking evaluation performed by the processing system 110. In accordance with various embodiments, the second eye tracking evaluation performed by the processing system 110 recognizes that within the coarser probabilities 302 and 304 of gaze locations (represented in FIG. 3 by the larger ellipses), there may be regions of the FOV 300 corresponding to higher probabilities 303 and 305 (or otherwise different probabilities) of the gaze location of each of the eyes 146A and 146B. These regions of higher probabilities 303/305 are represented in FIG. 3 by smaller ellipses within the larger ellipses. The regions where the large and small ellipses overlap with each other (shown in cross hatching) represent the higher/highest probabilities of the gaze locations of both eyes 146A and 146B with respect to vergence, and hence correspond to a more precise determination of the gaze locations of both eyes 146A and 146B, as compared to the results obtained by using the reflected light 148 and camera 108 alone for eye tracking.

In FIG. 3, the processing system 110 may be configured to use left-eye position data and right-eye position data (e.g., by analyzing the images 152) to generate a two-dimensional (2D) first map 306 of discrete probabilities for the left eye 146A, and a 2D second map 308 of discrete probabilities for the right eye 146B. The probabilities contained in the maps 306 and 308 may be generated based on or may otherwise correspond to the probabilities 302-305 of gaze location discussed above that are represented by the ellipses. As depicted by way of example, the maps 306 and 308 provide various discrete probabilities (e.g., estimates) of gaze location/position for each respective eye 146A and 146B (e.g., within the FOV 300). For example, for the first map 306 corresponding to the left eye 146A, relatively lower discrete probabilities of gaze location (e.g., 0% or 20%) exist around the exterior edges of the map 306, while relatively higher discrete probabilities of gaze location (e.g., 60%) exist towards the left-center of the map 306. Non-zero discrete probabilities are represented in the map 306 by vertical hatching. An analogous representation of discrete probabilities is contained in the map 308 for the right eye 146B.

The processing system 110 may be configured to generate a third map 310 that represents joint probabilities, such as a 2D joint-eye probability map that includes a plurality of gaze location probabilities corresponding to locations in the FOV 300. For example, the map 310 may provide refined estimates of a vergence location of the user's eyes 146, by combining or otherwise simultaneously using the discrete probabilities provided by the maps 306 and 308. Any suitable technique may be used to generate the joint probabilities in the map 310 from the discrete probabilities in the maps 306 and 308. For example, the discrete probabilities may be multiplied, added, and/or otherwise manipulated mathematically to generate the joint probabilities. It is also possible in some embodiments to perform interpolations, include weights, include scaling factors, include adjustment and standard deviation values, perform randomizations or error correction, etc. in order to arrive at the joint probabilities.

In the example of FIG. 3, the map 310 shows locations (with cross hatching) where the discrete probabilities of locations of the map 306 and 308 overlap (intersect) with each other and further shows a refined/adjusted probability for such locations in the map 310. These refined/adjusted probabilities in the map 310 (generally in the center region of the map 310, for example) may be higher probabilities as compared to the discrete probabilities contained in the maps 306 and 308 individually. The map 310 also shows (with vertical, horizontal, or no hatching) the non-overlapping regions of the maps 306 and 308, with the same or adjusted probability for these non-overlapping regions being indicated in the map 310. The vergence location for the eyes 146 may be determined in some embodiments by selecting locations in the map 310 that have the highest values of probabilities. In some embodiments, the vergence location determined from the map 310 can then be translated into the corresponding vergence location in an image/scene being viewed by the user, such as by way of (x, y, z) coordinates, vectors, or other methods.

It is understood that the depictions of the maps, probabilities, etc. of FIG. 3 are merely examples for purposes of illustration and explanation. For instance, while values of probabilities such as 0%, 10%, 30%, etc. are depicted in the maps at various locations of the map, such values are examples, and other values of probabilities may be provided. Moreover, while the probabilities have been expressed in terms of a percentage value, the probabilities may be represented in other formats, such as by some other numerical/non-numerical representation, by a symbol, by colors/shading/patterns, by gradients such via contours or other representation that varies, by ranges or thresholds, etc.

The probabilities may be obtained/determined using various methods. As one example, the probabilities may be preset or obtained from a lookup table. As other examples, the probabilities may be dynamically calculated (including interpolation) by the processing system 110 by analyzing the images 152 provided by the camera 108. As still another example, the probabilities may be obtained by the processing system 110 based on machine learning techniques. These are but a few examples of techniques that may be used by the processing system 110 to generate one or more of the maps 306, 308, and 310 and their corresponding values of probabilities.

It is also noted herein that the maps 306, 308, and 310 (including their sub-regions) are depicted in FIG. 3 and other drawings herein with generally rectangular shapes. These rectangular shapes are merely for purposes of explanation and illustration. Any of the maps (including their sub-regions) may have other 2D or other multi-dimensional shapes, contours, sizes, etc. that are not necessarily rectangular. Furthermore, some maps may not necessarily have shapes/contours in some embodiments. For instance, a map may be provided by way of a vector, database, table, variables, or other form of data structure that relates one piece of data to another piece of data (e.g., relating gaze location probabilities to locations in a FOV).

In accordance with various embodiments, the second eye tracking evaluation (such as previously explained above with respect to FIG. 3) recognizes that in some situations, using the overlapping probability maps from both eyes may be insufficient to more precisely disambiguate the gaze location of the user's eyes 146 (e.g., to more precisely determine what/where the user is looking at). Therefore, the second eye tracking evaluation performed by the processing system 110 can be augmented by considering further information about the image/scene being viewed by the user, as will be described next with reference to FIG. 4 and FIG. 5.

Figure 4:
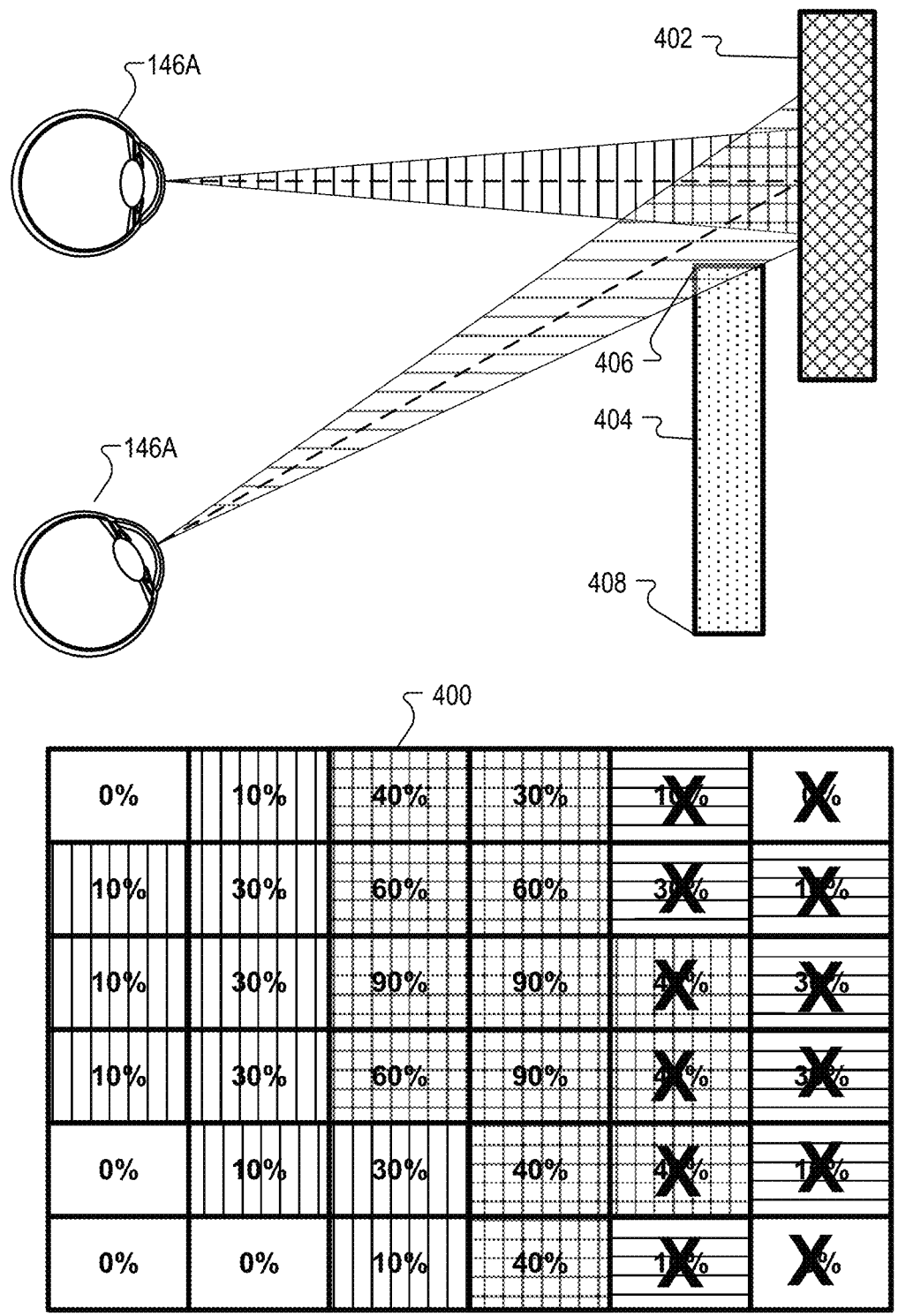
FIG. 4 illustrates eye tracking based on vergence near edges, in accordance with aspects of the disclosure.

FIG. 4 illustrates eye tracking based on vergence near edges, in accordance with aspects of the disclosure. Specifically, FIG. 4 shows an example joint-eye probability map 400 that may be generated to disambiguate the user's gaze location when first and second objects 402 and 404 (at different depths) are present in an image/scene in front of the user's eyes 146A and 146B. To perform this disambiguation operation during the second eye tracking evaluation, the processing system 110 examines the images 156 and/or the information 157, after having performed the operations depicted in FIG. 3 to generate an initial version of the map 400 of joint probabilities.

In FIG. 4, the initially generated version of the map 400 may have some ambiguity as to the gaze location of both eyes 146A and 146B jointly. However, based on an analysis of a discrete probability map (not shown in FIG. 4) corresponding to the left eye 146A and on a depth map (e.g., derived/obtained by the processing system 110 from the images 156 and/or the information 157) of the image/scene, the processing system 110 determines that the two objects 402 and 404 are present in the image/scene at different depths, and further determines with relative certainty that the left eye 146A is gazing at the object 402, which is deeper in depth relative to the object 404.

Due to the principle of vergence, in that two eyes are likely verging at the same depth, the processing system 110 determines that the right eye 146B is therefore also likely gazing at the object 402 (rather than gazing at the object 404). Accordingly, the processing system 110 can discard (or otherwise disregard or reduce probabilities of) any regions on the map 400 where the right eye 146B could be gazing at objects at different depths than the object 402. Such discarded regions (and their corresponding gaze probabilities) would correspond, for example, to any potential gazes upon a location of the image/scene that lie within edges 406 and 408 of the object 404. The resulting map 400 of FIG. 4 thus shows Xs where such corresponding probabilities are discarded/reduced, thereby yielding a more precise/refined map 400 of probabilities of gaze location.

Figure 5:
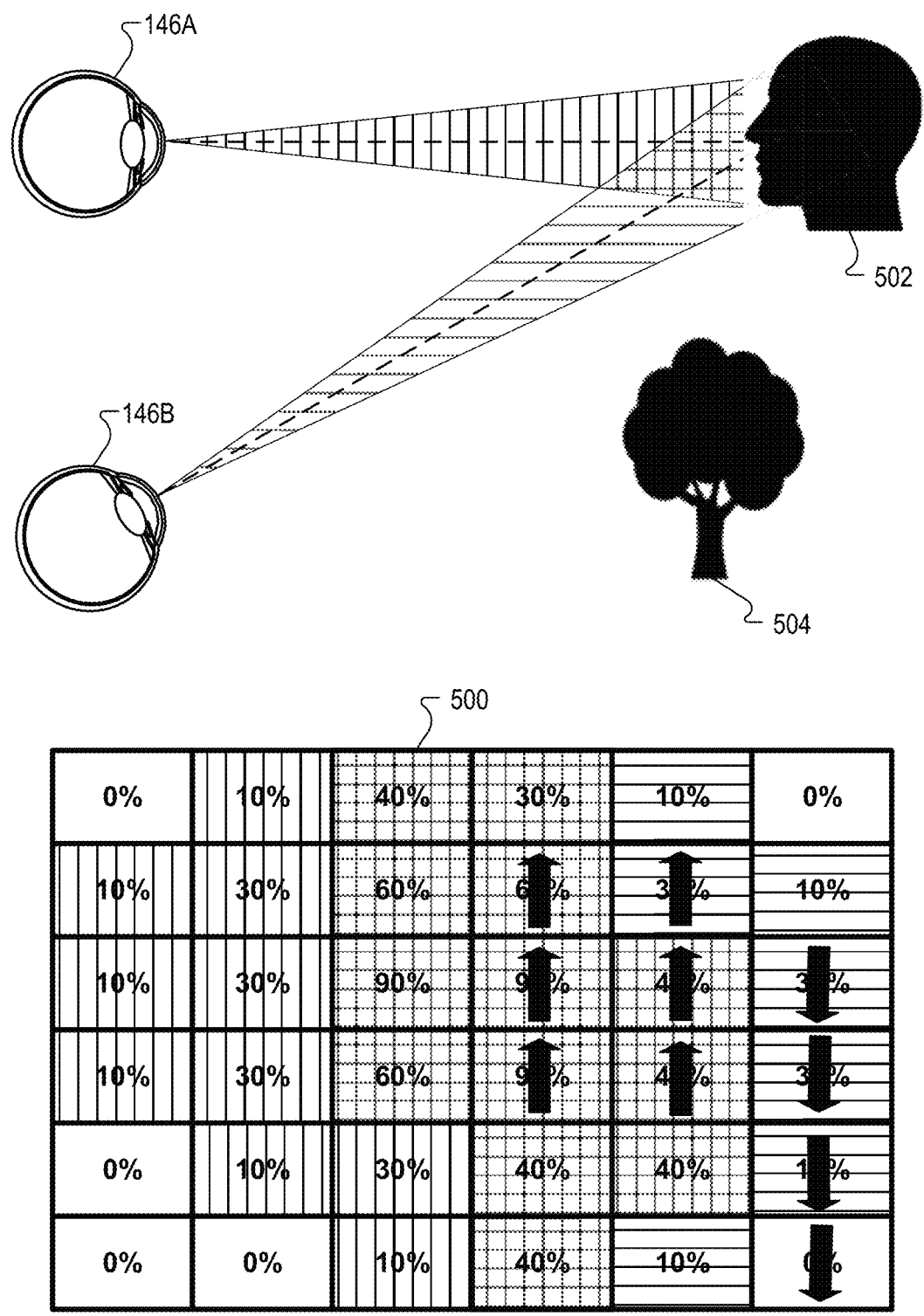
FIG. 5 illustrates eye tracking based on vergence and saliency, in accordance with aspects of the disclosure.

The above-described example of FIG. 4 (pertaining to the second eye tracking evaluation based on vergence near edges) can be still further refined/enhanced additionally or alternatively based on saliency information. For example, FIG. 5 illustrates eye tracking based on vergence and saliency, in accordance with aspects of the disclosure. Specifically, FIG. 5 shows an example joint-eye probability map 500 that may be generated to disambiguate the user's gaze location when two objects 502 and 504 (which may be at the same or different depths) are present in an image/scene in front of the user's eyes 146A and 146B. To perform this disambiguation operation during the second eye tracking evaluation, the processing system 110 analyzes the images 156 and/or the information 157 to generate or otherwise obtain a saliency map, after having performed the operations depicted in FIG. 3 to generate an initial version of the map 500 of joint probabilities.

According to various embodiments, a saliency map may highlight or otherwise identify regions in an image where the user's eyes 146 might focus. The processing system 110 and/or other system may execute a saliency algorithm (e.g., a saliency estimator) to estimate the likely importance of objects in an image/scene. Thus, the saliency map may identify saliency locations (regions) in the image/scene corresponding to high-frequency interest points, and may also identify low-frequency interest points.

As an example, FIG. 5 shows a first object 502 and a second object 504 in an image/scene. The first object 502 may be the head/body of a person, and the second object 504 may be trees or other background/foreground objects around the person. According to the saliency estimator, the first object 502 is likely to be more important (e.g., the likely target of most interest of the user's gaze), as compared to the second object 504, and so the saliency map would be correspondingly generated to show saliency locations for the first object 502.

Thus in FIG. 5, while the initially generated map 500 might have some ambiguities as to probabilities of the gaze location of both the left eye 146A and the right eye 146B, the processing system 110 can use the saliency map to perform disambiguation of probabilities of the gaze location. For instance, if the processing system 110 determines from the saliency map that the second object 504 is of less interest/importance than the first object 502, the processing system 110 can adjust/refine the map 500 to increase the probabilities for locations in the map 500 that correspond to the first object 502 (e.g., high-frequency interest points) and to decrease the probabilities for locations in the map 500 that correspond to the second object 504 (e.g., low-frequency interest points). The increase and decrease of the probabilities are respectively represented in the map 500 of FIG. 5 by up arrows and down arrows at certain locations in the map 500. The resulting map 500 thus yields more precise probabilities of the gaze location (jointly) of the user's eyes 146.

Any suitable technique may be used to generate the saliency map for the processing system 110. As an example, machine learning techniques may be used to generate the saliency map in some embodiments.

Other additional features/aspects may be provided by various embodiments. For instance, in some situations corresponding to FIG. 4 described above, it may not be possible to readily obtain or generate a depth map. To address this situation, some embodiments of the processing system 110 may implement an iterative depth-learning technique. For example, the processing system 110 may initially generate/ use a very coarse depth map that is a "best guess," and then iteratively refine the depth map over time as the determination of gaze location is correspondingly adjusted/refined.

As another example, the vergence of the user's eyes 146 may be calibrated using a training procedure. Machine learning techniques or some other iterative process may be used to perform this training.

As still another example, other visual information (e.g., metadata) can be used for eye tracking to further refine the estimates/probabilities of gaze location. In some embodiments, such other visual information may include data on accommodation (e.g., a distance at which the eyes are focused on in terms of optical blur), temporal aspects (e.g., eye movements), etc.

Figure 6:
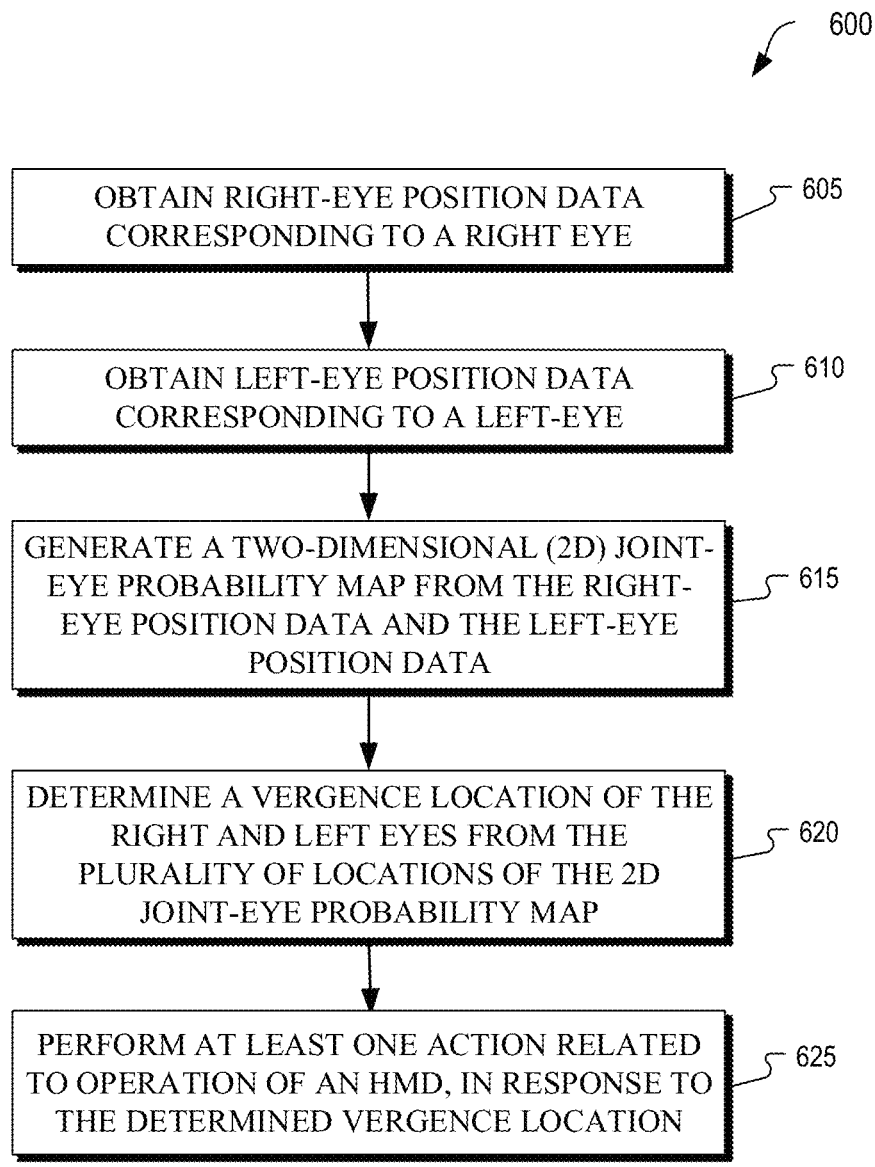
FIG. 6 is a flowchart illustrating an eye tracking method based on vergence, in accordance with aspects of the disclosure.

FIG. 6 is a flowchart illustrating an eye tracking method 600 based on vergence, in accordance with aspects of the disclosure. The various operations in the process blocks of the method 600 may be performed by the processing system 110, alone or in cooperation with other components of the HMD 100, including the near-eye optical system 140, an eye tracking system that includes the light source(s) 142 and the camera 108, etc.

The order in which some or all of the process blocks appear in the method 600 should not be deemed limiting. Rather, one of ordinary skill in the art having the benefit of the present disclosure will understand that some of the process blocks may be executed in a variety of orders not illustrated, or even in parallel. Furthermore, some process blocks may be removed, added, combined, supplemented with additional process blocks, etc.

In a process block 605, the processing system 110 obtains right-eye position data corresponding to the right eye 146B. In a process block 610, the processing system 110 obtains left-eye position data corresponding to the left eye 146A. For example, the camera 108 may provide the images 152 of the eyes 146A and 146B to the processing system 110.

In process a block 615, the processing system 110 generates a 2D joint-eye probability map (e.g., the map 310) from the right-eye position data and the left-eye position data. The 2D joint-eye probability map may include a plurality of gaze location probabilities corresponding to locations in the FOV 300.

In a process block 620, the processing system 110 determines a vergence location of the right and left eyes from the plurality of locations of the 2D joint-eye probability map. This determination of the vergence location may use or otherwise involve processing discrete probabilities of gaze locations for each eye, depth (and edge) information for objects contained in an image in the FOV, and saliency information for objects contained in the image.

In a process block 625, the processing system 110 performs at least one action related to the operation of the HMD 100, in response to the determined vergence location. Such action(s) may include, for example, applying foveated rendering to the image being viewed using the HMD 100, operating a gaze-contingent user interface (UI) at the vergence location, performing gaze-contingent tone mapping, performing gaze-contingent image quality corrections for the image, etc.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 107/110) in this disclosure may include one or more processors, microprocessors, multi-core processors, Application-specific integrated circuits (ASIC), and/or field programmable gate arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments, including what is described in the Abstract, is not intended to be exhaustive or to limit the invention to the precise forms disclosed. While specific embodiments of, and examples for, the invention are described herein for illustrative purposes, various modifications are possible within the scope of this disclosure, as those of ordinary skill in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for a head mounted device, the computer-implemented method comprising:
    obtaining right-eye position data corresponding to a right eye;
    obtaining left-eye position data corresponding to a left-eye;
    generating a two-dimensional (2D) joint-eye probability map from the right-eye position data and the left-eye position data, wherein the 2D joint-eye probability map includes a plurality of gaze location probabilities corresponding to locations in a field-of-view (FOV); and
    determining a vergence location of the right and left eyes from the plurality of locations of the 2D joint-eye probability map, wherein the vergence location is further determined based on at least one characteristic of at least one object in an image presented by the head mounted device.

2. The computer-implemented method of claim 1, wherein determining the vergence location includes selecting one or more of the locations, corresponding to highest gaze location probabilities among the gaze location probabilities, in the 2D joint-eye probability map as the vergence location.

3. The computer-implemented method of claim 1, wherein the at least one characteristic of the at least one object in the image comprises respective depths of a plurality of objects in the image, and wherein the computer-implemented method further comprises:
    analyzing a depth map corresponding to the plurality of objects in the image, wherein the plurality of objects include a first object and a second object, and wherein the analysis of the depth map determines that the first and second objects are at different depths in the image;
    determining that one of the left eye or the right eye is gazing at the first object; and
    in response to determination that the one of the left eye or the right eye is gazing at the first object, reducing gaze location probabilities for locations in the 2D joint-eye probability map that represent the other of the left eye or the right eye gazing at the second object.

4. The computer-implemented method of claim 3, wherein the locations in the 2D joint-eye probability map, which have their gaze location probabilities reduced, correspond to locations within edges of the second object.

5. The computer-implemented method of claim 1, wherein the at least one characteristic of the at least one object in the image comprises saliency of interest points in the image, and wherein the computer-implemented method further comprises:
    analyzing a saliency map corresponding to the image, wherein the analysis of the saliency map identifies saliency locations for high-frequency interest points in the image;
    increasing gaze location probabilities for locations in the 2D joint-eye probability map corresponding to the saliency locations; and
    decreasing gaze locations probabilities for locations in the 2D joint-eye probability map corresponding to low-frequency interest points in the image.

6. The computer-implemented method of claim 1, wherein the right-eye position data includes images of the right eye, wherein the left-eye position data includes images of the left eye, and wherein the images of the right and left eyes are generated by a camera of the head mounted device that receives non-visible light reflected from the right and left eyes.

7. The computer-implemented method of claim 1, further comprising in response to determination of the vergence location:
    performing at least one action related to operation of the head mounted device, wherein the at least one action includes one or more of:
        applying foveated rendering to the image, wherein the foveated rendering is applied at the vergence location;
        operating a gaze-contingent user interface (UI) at the vergence location;
        performing gaze-contingent tone mapping; and
        performing gaze-contingent image quality corrections for the image.

8. The computer-implemented method of claim 1, wherein generating the joint-eye probability map from the right-eye data and the left-eye data includes:
    generating a first 2D discrete-eye probability map from the left-eye data; and
    generating a second 2D discrete-eye probability map from the right-eye data, wherein the first and second 2D discrete-eye probability maps include a plurality of discrete gaze location probabilities for the left eye and the right eye, respectively, and
    wherein the joint-eye probability map is generated by combining the discrete gaze location probabilities from the first and second 2D discrete-eye probability maps.

9. A head mounted device, comprising:
    an eye tracking system configured to generate right-eye position data corresponding to a right eye and left-eye position data corresponding to a left eye;
    processing logic coupled to the eye tracking system; and
    one or more memories coupled to the processing logic, wherein the one or more memories store instructions that in response to execution by the processing logic, cause the head mounted device to perform operations to:
        generate a two-dimensional (2D) joint-eye probability map from the right-eye position data and the left-eye position data, wherein the 2D joint-eye probability map includes a plurality of gaze location probabilities corresponding to locations in a field-of-view (FOV); and
        determine a vergence location of the right and left eyes from the plurality of locations of the 2D joint-eye probability map, wherein the vergence location is further determined based on at least one characteristic of at least one object in the FOV.

10. The head mounted device of claim 9, wherein the operations to determine the vergence location includes operations to select one or more of the locations, corresponding to highest gaze location probabilities among the gaze location probabilities, in the 2D joint-eye probability map as the vergence location.

11. The head mounted device of claim 9, wherein the at least one characteristic of the at least one object in the FOV comprises respective depths of a plurality of objects in the FOV, and wherein the one or more memories store instructions that in response to execution by the processing logic, further cause the head mounted device to perform operations to:
   analyze a depth map of the plurality of objects in the FOV, wherein the objects include a first object and a second object, and wherein the analysis of the depth map determines that the first and second objects are at different depths in the FOV;
   determine that one of the left eye or the right eye is gazing at the first object; and
   in response to determination that the one of the left eye or the right eye is gazing at the first object, reduce gaze location probabilities for locations in the 2D joint-eye probability map that represent the other of the left eye or the right eye gazing at the second object.

12. The head mounted device of claim 9, wherein the at least one characteristic of the at least one object in the FOV comprises saliency of interest points in the FOV, and wherein the one or more memories store instructions that in response to execution by the processing logic, further cause the head mounted device to perform operations to:
   analyze a saliency map corresponding to the FOV, wherein the analysis of the saliency map identifies saliency locations for high-frequency interest points in the image FOV;
   increase gaze location probabilities for locations in the 2D joint-eye probability map corresponding to the saliency locations; and
   decrease gaze locations probabilities for locations in the 2D joint-eye probability map corresponding to low-frequency interest points in the FOV.

13. The head mounted device of claim 9, wherein the operations to generate the joint-eye probability map from the right-eye data and the left-eye data include operations to:
   generate a first 2D discrete-eye probability map from the left-eye data; and
   generate a second 2D discrete-eye probability map from the right-eye data, wherein the first and second 2D discrete-eye probability maps include a plurality of discrete gaze location probabilities for the left eye and the right eye, respectively, and
   wherein the joint-eye probability map is generated by combining the discrete gaze location probabilities from the first and second 2D discrete-eye probability maps.

14. The head mounted device of claim 9, further comprising a display configured to present an image having the determined vergence location of the right and left eyes.

15. A head mounted device, comprising:
   a near-eye optical system configured to present an image to left and right eyes of a user;
   an eye tracking system configured to generate right-eye position data corresponding to the right eye and left-eye position data corresponding to the left eye; and
   a processing system, coupled to the near-eye optical system and to the eye tracking system, configured to:
      perform a first eye tracking evaluation to obtain an estimate of a gaze location of the left and right eyes on the image presented by the near-eye optical system, wherein the first eye tracking evaluation obtains the estimate of the gaze location by using the right-eye position data and the left-eye position data generated by the eye tracking system; and
      perform a second eye tracking evaluation that refines the estimate of the gaze location, wherein the second eye tracking evaluation uses a vergence location of the left and right eyes to obtain the refined estimate of the gaze location, and wherein the vergence location is disambiguated based on at least one of depth information or saliency information, associated with a plurality of objects in the image presented by the near-eye optical system.

16. The head mounted device of claim 15, wherein to perform the second eye tracking evaluation, the processing system is configured to:
   generate a two-dimensional (2D) joint-eye probability map from the right-eye position data and the left-eye position data, wherein the 2D joint-eye probability map includes a plurality of gaze location probabilities corresponding to locations in a field-of-view (FOV) that includes the image presented by the near-eye optical system; and
   determine the vergence location of the right and left eyes from the plurality of locations of the 2D joint-eye probability map.

17. The head mounted device of claim 16, wherein to perform the second eye tracking evaluation, the processing system is further configured to:
   analyze a depth map corresponding to the depth information associated with the plurality of objects in the image presented by the near-eye optical system, wherein the plurality of objects include a first object and a second object, and wherein the analysis of the depth map determines that the first and second objects are at different depths in the image;
   determine that one of the left eye or the right eye is gazing at the first object; and
   in response to determination that the one of the left eye or the right eye is gazing at the first object, reduce gaze location probabilities for locations in the 2D joint-eye probability map that represent the other of the left eye or the right eye gazing at the second object,
   wherein the locations in the 2D joint-eye probability map, which have their gaze location probabilities reduced, correspond to locations within edges of the second object.

18. The head mounted device of claim 16, wherein to perform the second eye tracking evaluation, the processing system is further configured to:
   analyze a saliency map corresponding to the saliency information associated with the plurality of objects in the image being presented by the near eye optical system, wherein the analysis of the saliency map identifies saliency locations for high-frequency interest points in the image;
   increase gaze location probabilities for locations in the 2D joint-eye probability map corresponding to the saliency locations; and
   decrease gaze locations probabilities for locations in the 2D joint-eye probability map corresponding to low-frequency interest points in the image.

19. The head mounted device of claim 16, wherein to generate the joint-eye probability map from the right-eye data and the left-eye data, the processing system is configured to:
   generate a first 2D discrete-eye probability map from the left-eye data; and
   generate a second 2D discrete-eye probability map from the right-eye data, wherein the first and second 2D discrete-eye probability maps include a plurality of discrete gaze location probabilities for the left eye and the right eye, respectively, and wherein the joint-eye probability map is generated by the processing system by combining the discrete gaze location probabilities from the first and second 2D discrete-eye probability maps.

20. The head mounted device of claim 15, wherein the near-eye optical system is further configured to present a scene outside of the head mounted device to the left and right eyes of the user, and wherein the processing system is further configured to perform the first and second eye tracking evaluations with respect to objects in the scene.

* * * * *